PAUL H. HOFFMAN
INVENTOR.

PAUL H. HOFFMAN
INVENTOR.

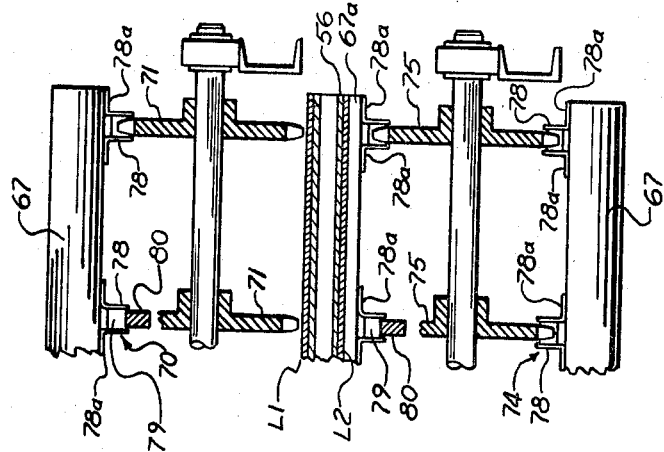
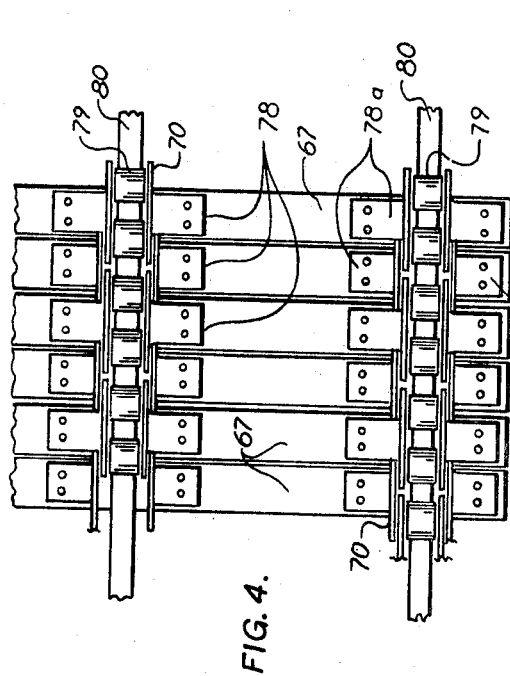
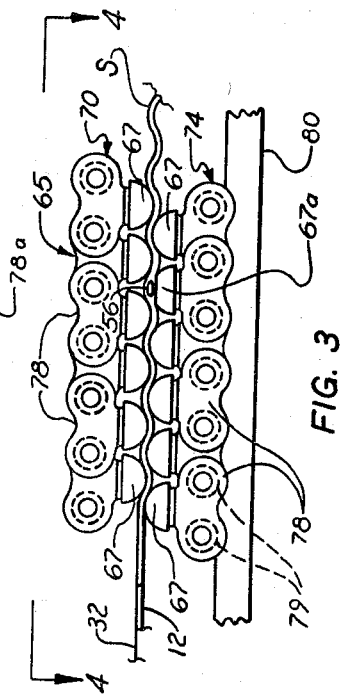

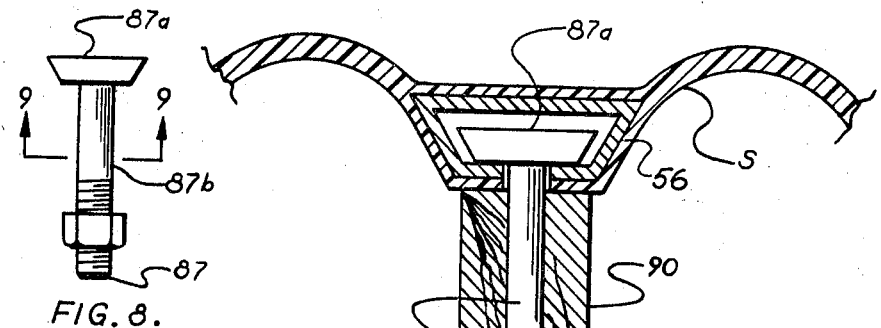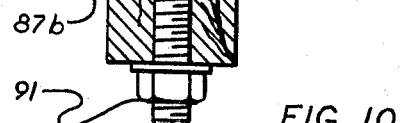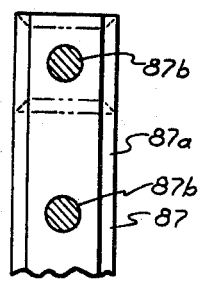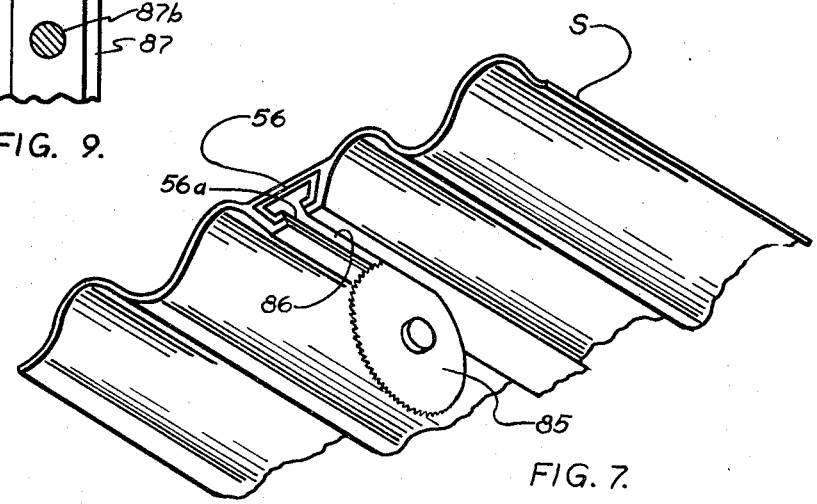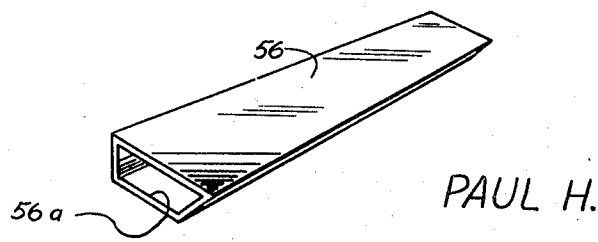

United States Patent Office 3,425,180
Patented Feb. 4, 1969

3,425,180
CORRUGATED RESIN SHEET WITH
HOLLOW MEMBER
Paul H. Hoffman, Tampa, Fla., assignor, by direct and mesne assignments, to Roy E. Raney, St. Petersburg, and Charles F. Clark, Tampa, Fla., co-trustees
Original application Feb. 27, 1961, Ser. No. 92,009, now Patent No. 3,271,215, dated Sept. 13, 1966. Divided and this application July 5, 1966, Ser. No. 589,767
U.S. Cl. 52—309                                      1 Claim
Int. Cl. E04c 2/32, 2/38

ABSTRACT OF THE DISCLOSURE

A structural sheet is formed of a reinforced plastic resin and has adjacent corrugations extending thereacross, which sheet is adapted to be secured to a building member or the like by headed fastener members having the heads in a hollow formation extending across the sheet parallel to the corrugations and having walls thereof formed by extensions of two adjacent corrugations. The hollow formation has a metal liner member and is slotted to receive the shanks of the fasteners.

---

This application is a division of application 92,009 filed Feb. 27, 1961, now Patent No. 3,271,215.

This invention relates to resinous sheet materials and to methods and apparatus for forming such materials. More particularly the invention is directed to improvements in fiber reinforced plastic sheeting, such as glass fiber reinforced polyester resin sheet material, and to improved methods and apparatus for forming such sheet material.

A principal object of the present invention is the provision of improved structural sheet material of the fiber reinforced plastic resin type which may or may not have corrugations or other configurations across the surfaces thereof, the improved sheet material including fastening means imbedded therein for cooperation with fastening elements such as screws or bolts for securing or anchoring the sheet material to structural members such as studs or rafters, one form of imbedded fastening means being, for example, aluminum channel members extending transversely of the sheet material and being imbedded or buried in the mixture of fibers and cured resin and disposed at intervals along the extent of the sheet material.

Other objects and advantages of the present invention will become apparent from the following detailed description of the preferred embodiments and methods of practice thereof and from the accompanying sheets of drawings forming a part of this specification, and in which FIG. 1 is a schematic illustration of apparatus for continuously forming reinforced plastic corrugated sheet material in accordance with the present invention;

FIG. 3 is an enlarged fragmentary elevational view showing a portion of the forming section of the apparatus;

FIG. 4 is a top view of the portion of the apparatus illustrated in FIG. 3;

FIG. 5 is a fragmentary sectional view on an enlarged scale taken substantially along line 5—5 of FIG. 2;

FIG. 6 is a perspective view of a fastening element before imbedding in the plastic sheeting;

FIG. 7 is a perspective view of a portion of corrugated plastic sheeting having a fastening element imbedded therein and illustrating one step in the processing thereof;

FIG. 8 is an elevational view of an anchoring member used for securing the sheeting of this invention;

FIG. 9 is a sectional view taken along line 9—9 of FIG. 8; and

FIG. 10 is a sectional view of reinforced corrugated sheet material embodying this invention and fastened to a building member.

Figure 1:
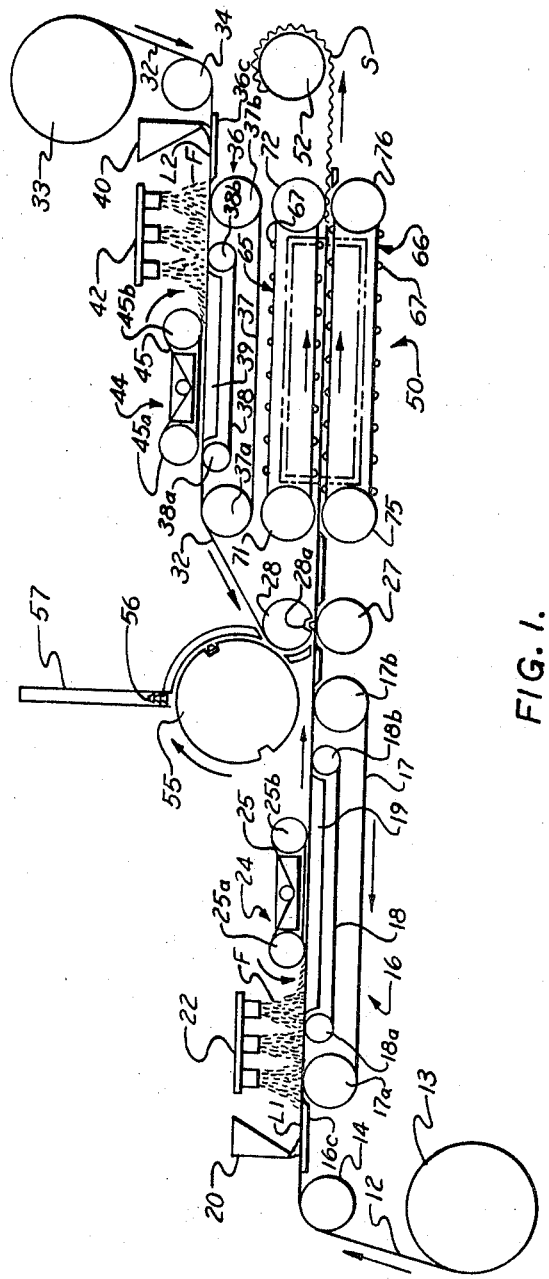

Referring to FIGS. 1 through 5 apparatus is shown for the manufacture of glass fiber reinforced polyester resin sheet material S which is corrugated and which is particularly suited for roofing, the width being in the order of twelve feet so that a normal roofing section can be had without joining seams. In addition, fastening elements 56 are formed integral with the sheet material S to enable the sheet to be attached to a structural frame in a secure, leak-proof manner. This apparatus comprises a suitable structure for feeding a first carrier web 12 from a supply roll 13, around a guide roller 14 and into a horizontal reach in which the web is supported by structure generally indicated at 16. Carrier web 12 may be paper or other flexible material and the width thereof necessary to produce the width of finished sheeting, and it may be provided with a parting surface to which cured plastic resin will not adhere so as to permit subsequent stripping of the carrier web from the finished sheet material.

The structure for handling web 12 may be similar to that well known in the art for handling similar web material and for sake of clarity not fully shown or described; however, structure 16 comprises an endless belt 17 of mesh chain of slightly greater width than web 12 and extending around suitable drive rollers or sprockets 17a and 17b so as to support the web throughout its width. The upper course of belt 17 is backed up by an endless belt 18 of chain mesh construction and extending around rollers or sprockets 18a and 18b. The upper course of belt 18 is in turn backed up by tracks or rails 19 on which the belt rides on rollers similar to rollers 79 described hereinafter with reference to FIGS. 3 and 4. A smooth platen 16c extends to the left of sprockets 17a, as viewed in FIG. 1, and supports carrier web 12 between guide roll 14 and endless belt 17.

Carrier web 12 is adapted to have a mixture of polymerizable liquid resin and chopped fiber reinforcing material formed in a continuous layer L1 thereon, with the fibers freely dispersed in the liquid resin. For this purpose carrier web 12 is supported and moved in a generally horizontal plane by belt 17 so as to pass beneath a first liquid or semi-liquid resin applying nozzle mechanism 20 which is disposed over platen 16c and applies a layer of polymerizable liquid resin, such as a polyester resin of the type well known in the art to which the invention pertains to the upper surface of the carrier web throughout its width. Web 12 continues in its movement beneath a fiber depositing means in the form of a chopper mechanism 22 which deposits short lengths of glass or other suitable fiber F onto the layer of resin on the surface of the web, the fiber being in discreet lengths and in random or haphazard condition. Any suitable chopper mechanism could be employed, one example being disclosed in U.S. Patent No. 2,719,336, and the fiber discharge is effected throughout the width of web 12 in a layer which will give approximately a ratio by weight of 40% fibers and 60% resin, however, this proportion could vary according to the character desired in the finished sheet. The resin and fibers F are then carried by web 12 beneath a depressor generally indicated at 24 and which comprises an endless belt or wide mesh chain 25 supported on suitable rollers or sprockets 25a, 25b and extending the width of the web so as to press the fibers into the resin and thereby thoroughly saturate the fibers with the resin to form an uninterrupted, homogeneous mixture therewith evenly distributed over the surface of the web. Structure 16 leads carrier web 12 and its supported mixture of fiber and resin between a pair of vertically spaced pinch rollers 27 and 28, the operation of which is described more fully hereinafter.

A second carrier web 32, similar to web 12, is fed from a supply roll 33 around a suitable guide roller 34 to a support structure generally indicated at 36 which serves to support and guide the second carrier web in a substantially horizontal plane toward roller 27 and 28. Structure 36 is similar to structure 16 and comprises a first back-up belt 37 extending about sprockets 37a and 37b, and a second back-up belt 38 extending about sprockets 38a and 38b. The latter belt is in turn backed up by tracks or rails 39. A smooth platen 36c extends between guide roll 34 and sprockets 37b and serves to provide solid support for web 32 passing thereover.

A second mixture of resin and fibers like the mixture formed on web 12 is formed in a layer L2 on the upper surface of carrier web 32 by a second resin applying nozzle means 40 similar to nozzle means 20, to apply a liquid or semi-liquid layer of polymerizable plastic resin onto second carrier web 32, and second fiber depositing means 42 similar to chopper means 22, is disposed to deposit a plurality of discreet lengths of reinforcing material such as glass fibers F in the layer of resin on the web 32. The fibers of layer L2 are pressed into the resin on web 32 by a second fiber depressing mechanism 44 which, like the mechanism 24, is conveniently in the form of an endless chain belt 45.

Carrier web 32 is then led about the upper roller 28 of the pinch roll means which serves to invert the carrier web 32 and reverse the direction of travel thereof so that the fiber and resin mixture bearing surface of web 32 is presented in super-imposed relation to the fiber and resin mixture bearing surface of the carrier web 12. Rolls 27 and 28 bring webs 12 and 32 together so as to unite the layers L1 and L2 of resin and fiber mixture thereon into a single resultant homogeneous layer between the two carrier webs. Rolls 27 and 28 are spaced a predetermined distance from one another so as to reduce the layer of resin-fiber mixture between the webs to a uniform predetermined thickness.

In the form of the invention presently described, a series of fastener elements 56 are formed integral with the sheet, and each fastener comprises an elongated metallic member such as an extruded aluminum tube of trapezoidal cross sectional configuration which extends the full width of the sheet and may be slit or cut along one wall to provide a receptacle for suitable bolts or the like to secure the finished sheets of the material S to building members or the like in a manner later described in detail.

Figure 2:
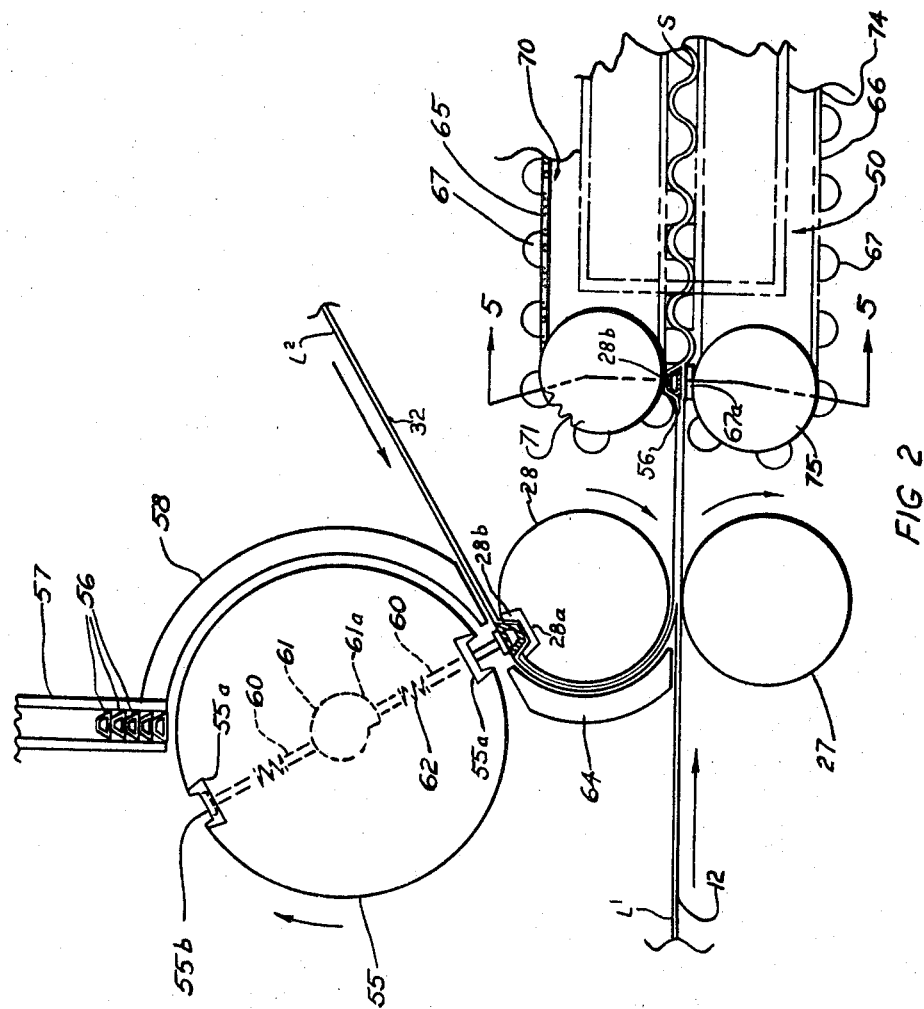
FIG. 2 is an enlarged fragmentary view of a portion of the apparatus of FIG 1.

A better understanding of the method and apparatus by which the fastener elements 56 are imbedded in the sheet material may be had by reference to FIG. 2. A drum 55 is rotatably supported for rotation about an axis lying in a plane extending transversely of web 12 and has a diameter twice that of pinch roll 28 and is driven at the same peripheral speed as that roll. The roll and drum supporting and driving means are not shown since such are well understood in the art and their description would merely confuse the description of the form of the invention shown. Drum 55 is provided with two diametrically located grooves 55a extending parallel to the axis thereof and which are provided with resilient rubber liners 55b for receiving and gripping the fastener elements 56 which are deposited therein by a magazine 57 which receives a supply of elements 56 in a tiered relation with the bottommost element being located immediately above and in parallel relation to grooves 55a so that an element is received into one of the grooves each time a groove passes beneath the magazine. An arcuate shoe 58, extends from the bottom of the magazine 57 to adjacent roll 28 and substantially the width of roller 55 to assure retention of elements 56 in the grooves 55a as they are carried by rotation of drum 55 to a position adjacent upper pinch roll 28 and overlying the resin bearing surface of the carrier web 32.

Pinch roll 28 is provided with a groove 28a having a resilient liner 28b, which, because of the equal peripheral speeds and the size relationship existing between roll 28 and dum 55, is positioned to receive the elements 56 from the drum 55. The transfer of elements 56 from grooves 55a to groove 28a is effected by a plurality of radially extending ejector rods 60 reciprocally mounted in drum 55 for rotation therewith with their inner ends riding on a stationary cam 61, and with their outer ends movable in openings in the groove liners 55b. It will be recognized that as each groove 55a is brought into alignment with groove 28a the corresponding ejector rods 60 will ride onto the lobe 61a of cam 61 and will cause the fastener element 56 to be ejected forcibly from groove 55a, against L2 carried by web 32, and into groove 28a carrying a portion of the web therewith. Web 32 may have slack between rollers 37a and 28 to allow for insertion of elements 56 therein as described without causing uneven movement in the resin and fiber depositing areas. Spring means 62 are provided for biasing the rods 60 radially inwardly as the inner ends thereof leave cam lobe 61a. Elements 56 are retained in groove 28a by an arcuate guide shoe 64 as they are carried to a position between the superimposed webs 32 and 12.

As the layers L1 and L2 of resin-fiber mixture are pressed together between rolls 27 and 28, the fastener elements 56 are imbedded or buried in the resultant layer of the mixture between webs 12 and 32, and while the fastener elements are so imbedded the webs 12 and 32 and the layers L1 and L2 thereon are pressed into corrugations and passed through a curing oven 50, as described presently.

The forming and curing oven 50 includes upper and lower endless forming means 65 and 66 between which the webs 12 and 32 pass, and the forming means each comprises a series of spaced, parallel semi-cylindrical forming bars 67 which extend transversely of the webs and which cooperate to form the corrugations by having upper and lower bars offset, as shown. The upper forming bars 67 are carried by a plurality of parallel, endless roller chains 70, best illustrated in FIGS. 3, 4, and 5, which are carried by sets of sprockets 71 and 72 suitably driven by means not shown. The lower forming bars 67 are attached to endless roller chains 74 extending about sprockets 75 and 76.

In order to accommodate the portions of webs 12 and 32 in which fastener elements are imbedded, forming bars 67a are interposed between the lower bars 67 and these bars are truncated to accommodate elements 56, as shown in FIGS. 2 and 3. The spacing of bars 67a correspond to the diameter of roll 28 and they are located so as to accept the elements as they are deposited between the layers of fiber-resin mixture carried by webs 12 and 32. Of course corrugated sheet material may be produced in the above manner without the inserts or fastener elements 56, in which case the modified bars 67a are replaced by semi-cylindrical bars. It will be understood that forming bars of other shapes and sizes may be substituted for the bars 67 to provide other configurations in the sheet material produced by the process and apparatus of this invention. It will also be understood that the forming bars may be made of any length required to correspond to the width of sheet material 3 by providing a suitable number of parallel sets of chains 70 and 74 to assure adequate support of the bars throughout their lengths. The length of oven 50 is designed relative to the speed of travel of the chains 70, 74 so as to cause the resin to be cured by the time the sheet material leaves the oven. As the sheet emerges from the oven it may be rolled as at 52. It may be desirable to trim the edges of sheet S prior to rolling it so that the finished edges will be perfectly true and firm. Trimmers for this purpose are familiar to those skilled in this art and none is shown.

Carrier webs 12 and 32, which have been described as being paper strips having their resin-fiber mixture bearing surfaces treated to form parting surfaces, are only temporarily laminated with the resin-fiber mixture as it is cured into a sheet and may be subsequently stripped therefrom. The parting surfaces of one or both of the webs may be provided with various finishes such as a pebble finish or a crinkle finish, which will result in completed sheeting the surfaces of which will be embossed with the finish of the webs. Alternatively, one or both of the carrier webs 12 and 32 may be permanently laminated with the cured resin-fiber mixture, in which case the webs may be provided with decorative matter, simulated wood finishes, for example.

Chains 70 and 74 are each made up of articulated links 78 having rolls 79 for engagement of the teeth of the sprockets and adapted to ride upon tracks 80 for preventing a catenary in the upper courses between their respective sprockets. The links 78 are each provided with a pair of horizontally extending flanges 78a to which the forming bars 67 are removably secured, each bar of the upper forming means 65 being secured to one link of each of the chains 74 thereof. The chains 70 of the upper forming means 65 have sufficient slack therein to permit the forming bars 67 on the lower course thereof to rest their full weight upon the webs 12 and 32 and the confined resin-fiber mixture being carried on the forming bars 67 of the upper course of chain 74, which weight is normally sufficient to form the webs and mixture into the corrugated configuration in which they are held as the forming bars pass through oven 50 to cure the resin and fiber into a finished sheet. It will be appreciated that as the webs 12 and 32 are corrugated by forming bars 67, the general length thereof is reduced and therefore feed sprockets 71, 72, 75 and 76 move at a linear rate below that of feed rate of webs 12 and 32 leaving rolls 27 and 28. The various feed rates involved in the apparatus described can be controlled by mechanisms well known in this art and are not described in detail to avoid unnecessary lengthy descriptions.

Referring now to FIGS. 7 through 10 there is illustrated a preferred method of forming means to secure sheet S to structural members such as studs, rafters, and the like. With more particular reference to FIG. 7 a portion of corrugated sheet material S includes a fastener element 56 which is shown completely imbedded or buried between the surfaces of the sheet material in the manner previously described. A portion of the sheet material S and of one wall 56a of the insert member may be removed, as by a rotary power saw 85, to form a slot 86 leading to the interior of fastener member 56. An anchoring member 87, having an elongated head portion 87a adapted to be received longitudinally within member 56 and a plurality of threaded shanks 87b which may extend through slot 86, is attached to element 56 by inserting the head in one end of element 56 with the shanks 87b projecting from slot 86. As is best shown in FIG. 10, the shanks 87b may be passed through a stud or rafter 90 and thereafter a nut 91 may be drawn up on each shank bringing the head 87a tightly against the element 56 and causing the latter to clamp the reinforced plastic sheet material S against the stud or rafter. Of course individual anchoring members in the form of bolts having but a single shank 87b may be utilized in which case the head portion 87a would be of rectangular configuration as indicated by broken lines in FIG. 9, and of a size to prevent rotation within the fastener member 56.

It will be recognized that other forms of fastener elements may be imbedded in the sheet by inserting them between the two layers of resin and fibers as described, and that anchoring means, such as screws could be threaded into the imbedded member to secure the sheet.

Although the present invention has been described with specific reference to several embodiments of the apparatus, methods, and products thereof as well as to certain advantages and uses thereof, it will be understood that the invention is not limited thereto, but rather the invention includes all those apparatus, methods, materials, products and uses as are reasonably embraced by the scope of the claim hereof.

Having thus described my invention, I claim:

1. Structural sheet material comprising a corrugated sheet of fiber reinforced plastic resin, a hollow member imbedded between the surfaces of said sheet and extending in parallel alignment with the corrugations of said sheet, and a slot extending from one outer surface of said sheet to the interior of said hollow member, said hollow member being adapted to receive the head of an anchor bolt with the shank thereof extending through said slot.

References Cited

UNITED STATES PATENTS

| | | | |
|---|---|---|---|
| 412,946 | 10/1889 | Cantwell | 52—483 |
| 2,459,765 | 1/1949 | Black | 296—31 |
| 2,543,970 | 3/1951 | Horsfall | 52—309 |
| 2,791,463 | 5/1957 | Levitt | 296—31 |
| 2,858,580 | 11/1958 | Thompson | 52—618 |
| 3,163,434 | 12/1964 | Krueger | 296—31 |
| 3,284,116 | 11/1966 | George | 52—364 X |

JOHN E. MURTAGH, *Primary Examiner.*

U.S. Cl. X.R.

52—483, 704, 617